(12) United States Patent
Shiohara (10) Patent No.: US 9,001,258 B2
(45) Date of Patent: Apr. 7, 2015

(54) IMAGE CAPTURING DEVICE AND IMAGE CAPTURING METHOD

(71) Applicant: Seiko Epson Corporation, Tokyo (JP)

(72) Inventor: Ryuichi Shiohara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 139 days.

(21) Appl. No.: 13/688,991

(22) Filed: Nov. 29, 2012

(65) Prior Publication Data

US 2013/0148013 A1 Jun. 13, 2013

(30) Foreign Application Priority Data

Dec. 7, 2011 (JP) ................................ 2011-267583

(51) Int. Cl.
| | |
|---|---|
| G03B 13/00 | (2006.01) |
| H04N 5/232 | (2006.01) |
| H04N 5/238 | (2006.01) |
| H04N 5/235 | (2006.01) |
| G03B 7/097 | (2006.01) |

(52) U.S. Cl.
CPC ......... *H04N 5/2353* (2013.01); *H04N 5/23212* (2013.01); *H04N 5/2352* (2013.01); *H04N 5/238* (2013.01); *G03B 7/097* (2013.01)

(58) Field of Classification Search
USPC .................................. 348/345, 347, 362–366
See application file for complete search history.

(56) References Cited

U.S. PATENT DOCUMENTS

| | | | | |
|---|---|---|---|---|
| 5,721,981 | A * | 2/1998 | Kosaka et al. | 396/130 |
| 6,584,284 | B1 * | 6/2003 | Odaka | 396/121 |
| 7,557,839 | B2 * | 7/2009 | Ohashi | 348/240.3 |
| 7,755,664 | B2 * | 7/2010 | Kakinuma et al. | 348/208.1 |
| 2001/0035910 | A1 * | 11/2001 | Yukawa et al. | 348/349 |
| 2008/0240701 | A1 * | 10/2008 | Kusaka | 396/104 |
| 2012/0044405 | A1 * | 2/2012 | Kimura et al. | 348/345 |

FOREIGN PATENT DOCUMENTS

| | | |
|---|---|---|
| JP | 2009-145670 A | 7/2009 |
| JP | 2009-303113 A | 12/2009 |

* cited by examiner

*Primary Examiner* — Daniel M Pasiewicz
(74) *Attorney, Agent, or Firm* — Global IP Counselors, LLP (57) ABSTRACT

A first state where an image is captured with a predetermined exposure in which an aperture of a diaphragm is a first aperture and a shutter speed is a first shutter speed is changed to a second state where an image is captured with the predetermined exposure in which the aperture of the diaphragm is a second aperture larger than the first aperture and the shutter speed is a second shutter speed higher than the first shutter speed, and a focal point is adjusted. The second aperture is set to be as large as possible within a range of maintaining the predetermined exposure.

13 Claims, 3 Drawing Sheets

IMAGE CAPTURING DEVICE AND IMAGE CAPTURING METHOD

CROSS-REFERENCE TO RELATED APPLICATIONS

This application claims priority to Japanese Patent Application No. 2011-267583 filed on Dec. 7, 2011. The entire disclosure of Japanese Patent Application No. 2011-267583 is hereby incorporated herein by reference.

BACKGROUND

1. Technical Field

The present invention relates to an image capturing device and an image capturing method.

2. Background Technology

An image capturing device has been known in which angle of view adjustment or focal point adjustment can be conducted in a state where an image to be captured is displayed on a display section. For example, Patent Document 1 discloses a configuration in which an image captured with a diaphragm closed to a maximum is displayed on a display section, and subsequently focal point adjustment is conducted with the diaphragm opened to a predetermined aperture. Patent Document 1 also discloses a configuration in which a gain of an image capturing element is controlled to prevent the brightness of an image from increasing as the diaphragm is opened.

Japanese Laid-open Patent Application No. 2009-303113 (Patent Document 1) is an example of the related art.

SUMMARY

Problems to be Solved by the Invention

In the technology of Patent Document 1, in order to prevent the brightness of an image from changing by adjusting a gain of the image capturing element, the adjustment amount of the gain to prevent the brightness from changing needs to be set in advance. Also, feedback control and the like based on the brightness of an image needs to be conducted, which results in complicated control. Further, although a larger aperture of the diaphragm at the time of focal point adjustment has more advantage to increase the accuracy of the focal point adjustment, the diaphragm cannot always be set to a maximum aperture so as not to change the brightness of an image displayed on the display section.

Further, in a general image capturing element, the adjustment width of a gain has a reasonable tolerance when the gain is increased to capture an image with high sensitivity in a dark place (for example, about 5 EV). On the other hand, it is configured such that the adjustment width of the gain does not have a reasonable tolerance when the gain is reduced (for example, about 1 EV). If the adjustment width of the gain is large in both cases of increasing the gain and reducing the gain, the gain in standard setting is high, which increases a noise component and deteriorates an image quality. Therefore, in a case of an operation in which the diaphragm is opened by several strokes to the open side, the gain cannot be reduced enough to cancel a change in an exposure caused by opening the diaphragm even if the gain is reduced.

The invention has been made to address the above-described circumstances, and an advantage of the invention is to provide a technology which can reduce a change in the brightness of an image as much as possible with a simple configuration.

Means Used to Solve the Above-Mentioned Problems

An image capturing device according to the invention has a configuration in which an exposure is controlled by a diaphragm and a shutter speed, and the focal point of a lens is adjusted while an image is displayed on a display section. Also, the image capturing device according to the invention conducts focal point adjustment after changing a first state to a second state, the first state and the second state being states of the diaphragm and the shutter speed before conducting focal point adjustment. After conducting the focal point adjustment, the second state is changed to the first state. Further, when the first state is changed to the second state, an aperture of the diaphragm is controlled to be a second aperture that is larger than a first aperture, and the shutter speed is controlled to be a second speed that is higher than a first speed, so that a predetermined exposure that is an exposure in the first state is not changed.

In other words, when the first state is changed to the second state, although the aperture of the diaphragm becomes large, an exposure is maintained before and after changing the state by making the shutter speed high. Since the depth of field becomes smaller as the aperture of the diaphragm becomes larger, when the aperture of the diaphragm is increased at the time of adjusting the focal point of the lens by a focal point adjusting section based on the output of an image capturing section, a change in an image due to the difference in the focal position becomes large. Accordingly, as the aperture of the diaphragm is increased, it becomes easier to adjust the focal point. It is thus preferable that the aperture of the diaphragm is as large as possible when the focal point is adjusted in a state where the first state is changed to the second state.

In order to increase the aperture of the diaphragm while maintaining the exposure in the predetermined exposure, the shutter speed needs to be made high so as to follow the change in the aperture. In a realistic image capturing device, however, an actually feasible maximum speed of the shutter speed has an upper limit. Therefore, there are cases where the aperture of the diaphragm cannot be changed to the maximum aperture while maintaining the predetermined exposure. In sum, if the aperture of the diaphragm is made the maximum aperture, there are cases where the amount of light can be larger than the amount of light in the predetermined exposure even if the shutter speed is made the maximum speed.

In the invention, therefore, when a shutter speed to achieve the predetermined exposure in a state where the aperture of the diaphragm is the maximum aperture can be selected, the second state is achieved by the shutter speed to achieve the predetermined exposure in a state where the aperture of the diaphragm is the maximum aperture, and the maximum aperture. With this configuration, the focal point can be adjusted by controlling the diaphragm to have the maximum aperture as long as the predetermined exposure is maintained.

On the other hand, when the shutter speed to achieve the predetermined exposure in a state where the aperture of the diaphragm is the maximum aperture cannot be selected, the second state is achieved by an aperture that is larger than the first aperture to achieve the predetermined exposure in a state where the shutter speed is a higher shutter speed than the first shutter speed and smaller than the maximum aperture, and a shutter speed higher than the first shutter speed. Specifically, by selecting a combination of the diaphragm that achieves the predetermined exposure at a shutter speed higher than the first shutter speed, and this shutter speed, from combinations of the shutter speed and the aperture of the diaphragm that can be selected to maintain the predetermined exposure, it is possible to set a state in which the focal point is easier to adjust as the second state among these combinations. When a maximum speed that can be selected as the shutter speed can be selected as the shutter speed higher than the first shutter speed, this maximum speed can be set as the second shutter speed. With this configuration, the aperture of the diaphragm can be set as large as possible. Also, with the above-described configurations, the diaphragm can be set to conduct focal point adjustment in a state where the predetermined exposure is maintained only by adjusting the aperture of the diaphragm and the shutter speed. Accordingly, a change in the brightness of an image can be reduced as much as possible with a simple configuration. Incidentally, the terms such as "maintain the predetermined exposure" or "an exposure does not change" do not mean that a change does not occur in a strict sense, but mean that a change does not occur to an extent that an ordinary person cares. For example, a change can occur when strictly measured by a measuring instrument.

Here, it is sufficient for the image capturing section to be able to capture an image by light that has passed through one or more lenses. Image capturing can be conducted by detecting the light amount received by an image capturing element, and an image processing section for conducting image processing based on the output of the image capturing element can be included in the image capturing section.

It is sufficient for the focal point adjusting section to be able to adjust the focal point of the lens based on the output of the image capturing section. For example, the focal point adjusting section can include a mechanism that drives a part or all of a plurality of lens in an optical axis direction based on light taken from a target by the image capturing section, and a controlling section thereof. In a case of using a liquid lens, a mechanism for deforming the lens can also be included. Obviously, various methods can be used as a method for adjusting the focal point by the focal point adjusting section. In a configuration in which the image capturing section includes an element for phase difference detection, the focal point can be adjusted by a phase difference detection method based on the output of this element, or the focal point can be adjusted by the contrast of an image based on the output of an image capturing element for capturing an image included in the image capturing section.

It is sufficient for the diaphragm adjusting section to be able to adjust the aperture of the diaphragm. The diaphragm is a mechanism configured to change an aperture of an opening that serves as a light path in a plane perpendicular to the optical axis of the lens by arranging a plurality of shielding plates and the like to be rotatably supported in the plane perpendicular to the optical axis of the lens. It is thus sufficient for the diaphragm adjusting section to be configured to be able to drive the mechanism for changing the aperture of the diaphragm, and control the diaphragm to have an aperture corresponding to a set value in a state where a driving amount of the diaphragm required for the aperture corresponding to the set value of the diaphragm such as an F value has been specified in advance. Incidentally, the set value of the diaphragm can be designated by an arbitrary method including a configuration in which the set value of the diaphragm is designated by a user, a configuration in which the set value of the diaphragm is designated by default of the image capturing device, or a configuration in which the set value of the diaphragm is specified based on another parameter (such as a set value of the shutter speed or an exposure value). Generally, an optical system including the lens and the diaphragm in the image capturing section is enclosed by a lens tube whose central axis is the optical axis. Thus, the movable range of the diaphragm is limited, and the aperture of the diaphragm has a maximum aperture and a minimum aperture.

It is sufficient for the shutter speed adjusting section to be able to adjust the shutter speed. Specifically, it is sufficient for the shutter speed adjusting section to be configured to be able to control the length of a state in which light from a target is detected by the image capturing element to be a length corresponding to the set value of the shutter speed by switching a state in which light from a target is detected by the image capturing element and a state in which light from a target is not detected by the image capturing element. Incidentally, the set value of the shutter speed can be designated by an arbitrary method including a configuration in which the set value of the shutter speed is designated by a user, a configuration in which the set value of the shutter speed is designated by default of the image capturing device, or a configuration in which the set value of the shutter speed is specified based on another parameter (such as a set value of the diaphragm or an exposure value).

It is sufficient for the shutter to be able to switch a state in which light from a target is detected by the image capturing element and a state in which light from a target is not detected by the image capturing element. Preferably, an electronic shutter is used to change the shutter speed while an image captured by the image capturing section is displayed on the display section. An electronic shutter is a shutter that is achieved by controlling exposure time in each pixel of the image capturing element. In a CMOS sensor, for example, it is called as a rolling shutter. Further, a shutter has a physically possible shutter speed, and a maximum speed of a shutter is determined beforehand in an image capturing device.

It is sufficient for the display section to be disposed in the image capturing device, and the position is not limited. The display section can be disposed on an outer circumferential surface of a case of the image capturing device to be observed from outside, or the display section can be disposed inside the image capturing device to be observed through a finder. In either case, it is sufficient that the first state before conducting focal point adjustment is changed to the second state for conducting focal point adjustment while an image captured by the image capturing section is displayed on the display section. In other words, it is sufficient that an image is displayed on the display section during a period before conducting an operation for bringing a desired position of a target into focus by a user until conducting such an operation.

It is sufficient for the state controlling section to control an exposure by a combination of the diaphragm and the shutter speed, and adjust the focal point by giving instructions to the diaphragm adjusting section, the shutter speed adjusting section, and the focal point adjusting section, so that the first state and the second state can be switched while maintaining the predetermined exposure, and the focal point can be adjusted in the second state. The first state is a state before conducting focal point adjustment. In the first state, the aperture of the diaphragm is made the first aperture and the shutter speed is made the first shutter speed by the set values set in advance. Further, in the first state, an image captured with the first aperture at the first shutter speed is displayed on the display section. A user thus can conduct an operation such as changing the angle of view by changing the angle of the image capturing device while observing the image captured in the first state by the display section.

In this instance, since the image displayed on the display section is an image captured in a state where the diaphragm is the first aperture, blur of the image and the like due to the diaphragm of the first aperture can be observed. Accordingly, when the first aperture is an aperture corresponding to the set value designated by a user, blur of the image and the like due to the diaphragm designated by a user in the first state can be observed.

The second state is a state for conducting focal point adjustment. The aperture of the diaphragm in the second state is the second aperture if the second aperture larger than the first aperture is possible. The aperture of the diaphragm in the second state is the first aperture if the first aperture is a maximum aperture or the shutter speed is a maximum speed in the first state. Hereinafter, a case where the second aperture is possible will be described. If the second aperture is possible, focal point adjustment can be conducted with higher accuracy in the second state than focal point adjustment in the first state. Then, the shutter speed in the second state becomes the second shutter speed higher than the first shutter. Accordingly, a period of time for detecting light by the image capturing element is reduced so as to cancel the effect of increasing the amount of light passing through the lens by opening the diaphragm.

Further, it is sufficient for the state controlling section to adjust the focal point with a maximum aperture of the diaphragm when the shutter speed to achieve the predetermined exposure can be selected in a state where the aperture of the diaphragm is the maximum aperture, and make the shutter speed a maximum speed when the predetermined exposure cannot be achieved in a state where the aperture of the diaphragm is the maximum aperture. In order to achieve this, various configurations are possible. For example, it can be configured such that the second state is achieved by selecting a combination that maximizes the aperture of the diaphragm from combinations of the exposure value achieved in the first state, and the aperture and the shutter speed that achieves the same exposure value.

The first state and the second state can be switched while an image is displayed on the display section, and an image continues to be displayed on the display section in the process of changing the state, and before and after changing the state. Specifically, by keeping displaying a real-time image captured in the first state and the second state on the display section, the state of a target can be observed continuously before and after focal point adjustment. In each state, therefore, an image to be displayed needs to be generated by repeating processing of capturing an image at the shutter speed of each state, and it is thus preferable to use an electronic shutter that can conduct a shutter operation by repeating the first shutter speed and the second shutter in a short period of time.

The aperture of the diaphragm does not change non-continuously but changes continuously in a configuration that adjusts the aperture of the diaphragm by driving a plurality of shielding plates. Therefore, in order to change the first state to the second state while maintaining the predetermined exposure, the shutter speed needs to be continuously changed to follow a continuous change in the aperture of the diaphragm. In a general image capturing device, it is difficult to arbitrarily set the speed at the time of changing the aperture of the diaphragm and the speed at the time of changing the shutter speed. Therefore, although it is preferable that the change in the shutter speed completely follows the change in the aperture of the diaphragm, actually it might be difficult.

When the change in the shutter speed does not follow the change in the aperture of the diaphragm, and the change in the aperture of the diaphragm precedes the change in the shutter speed, an image displayed on the display section becomes bright for a moment. When the change in the aperture of the diaphragm gets behind the change in the shutter speed, an image displayed on the display section becomes dark for a moment. In comparison, a user who is conducting angle of view adjustment and the like by looking at the display section carefully might turn the eyes in the former case, and a user just looks at the display section more carefully in the latter case. The former thus brings more discomfort to a user than the latter. Therefore, with a configuration in which the change in the shutter speed precedes the change in the diaphragm at the time of changing the first state to the second state, discomfort to a user can be reduced when the change in the shutter speed does not follow the change in the aperture of the diaphragm.

Further, the change rate of the aperture in the process of changing the diaphragm might be different between a case where the aperture of the diaphragm is large and a case where the aperture of the diaphragm is small (for example, the time required for changing the diaphragm by one level might be different depending on the aperture of the diaphragm). Thus, when the change rate of the aperture is different depending on the size of the aperture of the diaphragm, a configuration in which the shutter speed is changed at the change rate corresponding to the first aperture at the time of changing the first state to the second state can be employed. Specifically, since the change rate of the aperture is different depending on the size of the first aperture, the change in the shutter speed can be caused to follow the change in the aperture of the diaphragm by changing the shutter speed at the change rate corresponding to the change rate of the aperture depending on the size of the first aperture.

The image capturing device according to the invention can be configured to have an image capturing section that captures an image by light passing through a lens, a focal point adjusting section that adjusts the focal point of the lens based on the output of the image capturing section, a diaphragm adjusting section that adjusts the aperture of the diaphragm at the time of image capturing in the image capturing section, a shutter speed adjusting section that adjusts the shutter speed at the time of image capturing in the image capturing section, a display section that displays an image captured by the image capturing section, and a state controlling section that changes the first state where the image is captured with the predetermined exposure in which the aperture of the diaphragm is the first aperture and the shutter speed is the first shutter speed to the second state where the image is captured with the predetermined exposure in which the aperture of the diaphragm is the second aperture larger than the first aperture and the shutter speed is the second shutter speed higher than the first shutter speed by giving instructions to the diaphragm adjusting section and the shutter speed adjusting section while the image captured by the image capturing section is displayed on the display section, and adjusts the focal point in the second state by giving instructions to the focal point adjusting section, the state controlling section causing the change in the shutter speed to precede the change in the diaphragm when changing the first state to the second state.

Further, adjusting the focal point with the aperture of the diaphragm being as large as possible among combinations of a possible aperture of the diaphragm and a possible shutter speed according to the invention can be applied as a program or a method. Also, the above-described device, program, and method are achieved by a single device or devices having a complex function through a common component, and include various embodiments.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
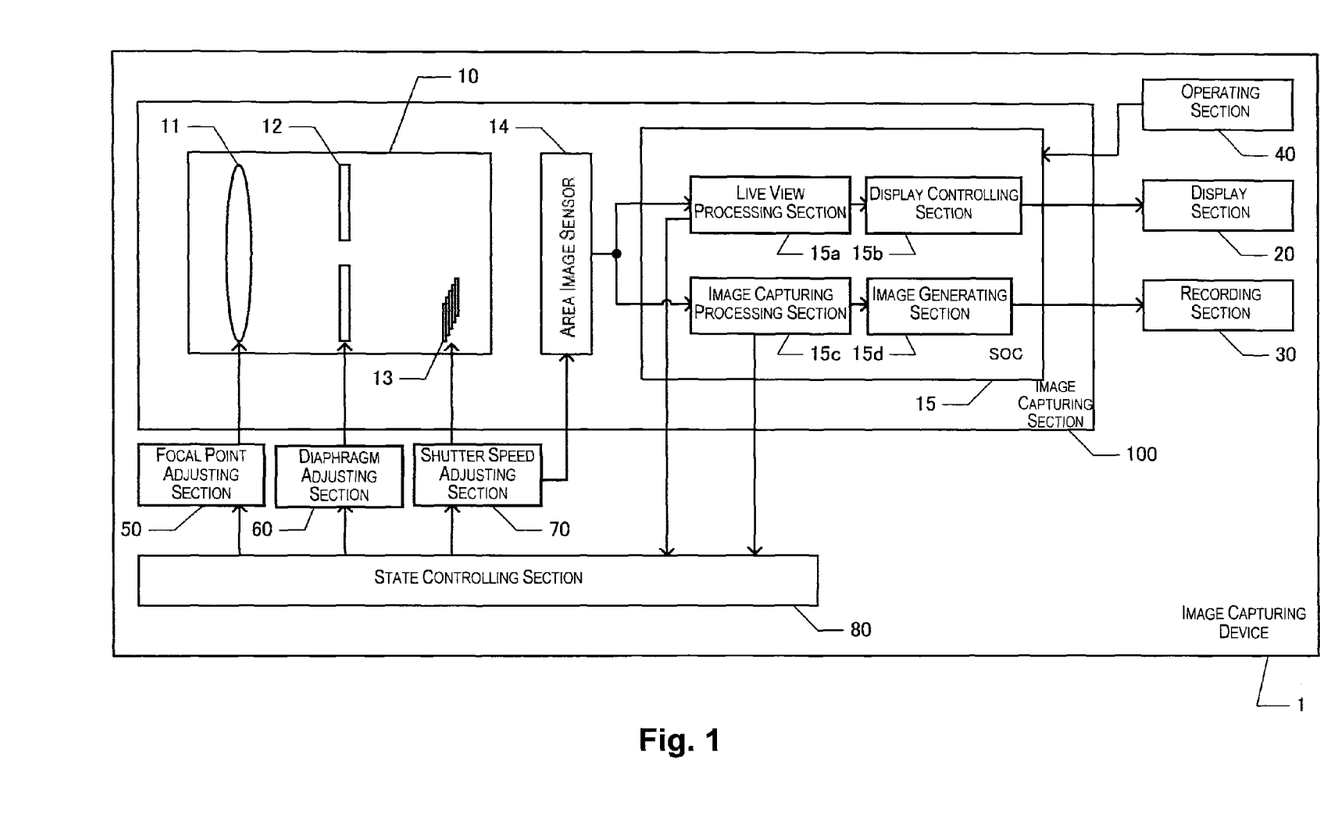
FIG. 1 is a block diagram according to an embodiment of the invention.

Here, embodiments of the invention will be explained in the following order:
(1) Configuration of image capturing device
(2) Operation in live view image capturing
(3) Other embodiments (1) Configuration of Image Capturing Device As shown in FIG. 1, the image capturing device 1 according to an embodiment of the invention has an image capturing section 100, a display section 20, a recording section 30, an operating section 40, a focal point adjusting section 50, a diaphragm adjusting section 60, a shutter speed adjusting section 70, and a state controlling section 80.

The operating section 40 has a shutter button, an operating section for switching an image capturing mode, an operating section for switching a diaphragm, an operating section for switching a shutter speed, and an operating section for operating a menu for various kinds of settings. A user can give various kinds of instructions to the image capturing device 1 by operating the operating section 40. In the present embodiment, a stroke amount of the shutter button can be detected by two levels. That is, a stroke amount of the shutter button can be detected by differentiating a state in which the shutter button is pressed halfway and a state in which the shutter button is pressed fully. In the present embodiment, when the shutter button is pressed halfway, it is considered that instructions are given to conduct focal point adjustment while continuing a live view display. When the shutter button is pressed fully, it is considered that instructions are given to record an image on a recording medium.

The display section 20 has an interface circuit, a liquid crystal panel driver, a liquid crystal panel, an eye lens, and the like, which are not shown in the drawings. In the present embodiment, the display section 20 is an EVF (Electronic View Finder) that displays an image showing a target of image capturing, and allows a user to know information on the state of the target before image capturing the conditions of image capturing and the like. The image capturing device 1 according to the present embodiment is a mirror-less digital camera provided with an EVF.

The recording section 30 is configured such that a recoding medium, not shown in the drawing, can be inserted into the recording section 30. Information can be recorded on a recording medium and information can also be read out from the recording medium in a state where the recording medium is inserted into the recording section 30.

The image capturing section 100 has an optical system 10, an area image sensor 14, and an SOC (System On a Chip) 15. The optical system 10 has a lens 11 that forms an image of the target in the area image sensor 14, a diaphragm 12, and a shutter 13. In the present embodiment, the lens 11 and the diaphragm 12 are disposed in a lens tube, and the lens tube is attached to a case, that is not shown in the drawing, in a replaceable manner. In the present embodiment, the lens 11 includes a plurality of lenses that are arranged in a direction parallel to an optical axis. In FIG. 1, however, only one lens is illustrated for simplicity. Each lens is supported in the outer edge portion thereof. A part of or all of the lenses are arranged to be movable in the optical axis direction, so that a position of the focal point can be adjusted and an optical zoom operation can be conducted. Alternatively, another configuration can be used as the optical configuration. For example, a liquid lens can be used as the lens. By deforming the lens, a position of the focal point can be adjusted and an optical zoom operation can be conducted. In the present embodiment, the diaphragm 12 is composed of a plurality of light shielding plates supported in a rotatable manner in a plane perpendicular to the optical axis of the lens 11, and an area of a portion that is not shielded in the plane perpendicular to the optical axis can be changed by rotation of the plurality of light shielding plates in conjunction with each other. The aperture of the diaphragm 12 is a value of the non-shielded portion shown by a distance from the center of the optical axis.

Figure 2A:
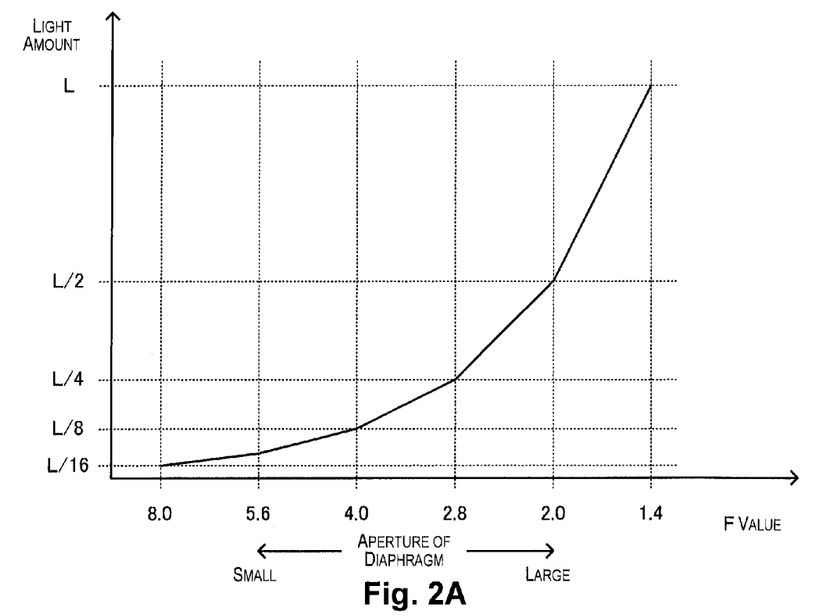
FIG. 2A shows a relationship between an F value and an amount of light.

In the image capturing device 1 according to the present embodiment, an F value that is a set value of the diaphragm can be selected in a range of 1.4-22.0. As the F value decreases, the aperture of the diaphragm 12 increases. An amount of light can be changed to be ½ or twice by changing the diaphragm 12 by one level. FIG. 2A is a graph showing relative change in the amount of light in a case where the F value is 8.0-1.4. Specifically, in FIG. 2A, the amount of light when the F value is changed with a fixed shutter speed is shown in the vertical axis, the F value is shown in the horizontal axis, and the amount of light that reaches the area image sensor 14 when image capturing is conducted with the F value of 1.4 is shown as L. As shown in FIG. 2A, when the F value is increased by one level (to be about 2½ times, and then the aperture decreases), the amount of light becomes ½. When the F value is decreased by one level (to be about $½^{1/2}$ times), the amount of light becomes twice.

The shutter 13 is a mechanical focal-plane type shutter, and is provided with an openable (folding) light shielding curtain that is formed in a shape of a plurality of vanes as a light shielding section having a plane plate shape parallel to a plane of an image capturing element of the area image sensor 14. The light shielding curtain is driven in a direction perpendicular to the optical axis so as to open and close the vanes. Normally, the light shielding curtain is retained without interrupting a light path in a direction parallel to the optical axis. When a predetermined trigger is given in a state where the light shielding curtain is retained without interrupting a light path, the state where the light shielding curtain is retained is released, and the light shielding curtain is driven in the direction perpendicular to the optical axis such that the plurality of vanes interrupt a light path. In the present embodiment, the shutter 13 and an electronic shutter of the area image sensor 14 are combined. An exposure is started in the electronic shutter, and an exposure is ended in the shutter 13. Consequently, exposure time in the area image sensor 14 for capturing an image to be recorded on a recording medium is controlled to be time that substantially corresponds to a shutter speed in all pixels of the area image sensor 14.

The area image sensor 14 is a CMOS (Complementary Metal Oxide Semiconductor) image sensor provided with a color filter of a Bayer array and a plurality of photo diodes which store charges corresponding to the amount of light in each pixel by photoelectric conversion. The image capturing element can be another sensor such as a CCD (Charge Coupled Device) image sensor. In the present embodiment, it is possible to use an electronic shutter operation in the area image sensor 14 when an exposure is started and when an exposure is ended. Specifically, the area image sensor 14 can control the timing when an exposure is started and the timing when an exposure is ended in a photoelectric conversion element per line, and adjust the timing when an exposure is started and the timing when an exposure is ended such that the length of a state in which the image capturing element can detect light is the same in each line. In the present embodiment, exposure time when capturing an image for a live view display is controlled by using an electronic shutter when an exposure is started and when an exposure is ended.

Therefore, the image capturing device 1 according to the present embodiment can control exposure time by combining the shutter 13 that is a mechanical shutter and the electronic shutter of the area image sensor 14, and can also control exposure time only by the electronic shutter of the area image sensor 14. Specifically, when an image to be recorded on a recording medium is captured, exposure time is controlled by an electronic front curtain—mechanical rear curtain shutter method. More specifically, an exposure is started by the electronic shutter in order of the lines, and light shielding by the mechanical shutter is started so as to shield light each line at timing that becomes a shutter speed in which exposure time is set per line. On the other hand, when an image for a live view display is captured, exposure time is controlled by the electronic shutter method. Specifically, both of the front curtain and the rear curtain are controlled by the electronic shutter. More specifically, an exposure is started by the electronic shutter in order of the lines, and an exposure is ended so as to become a shutter speed in which exposure time is set per line.

Figure 2B:
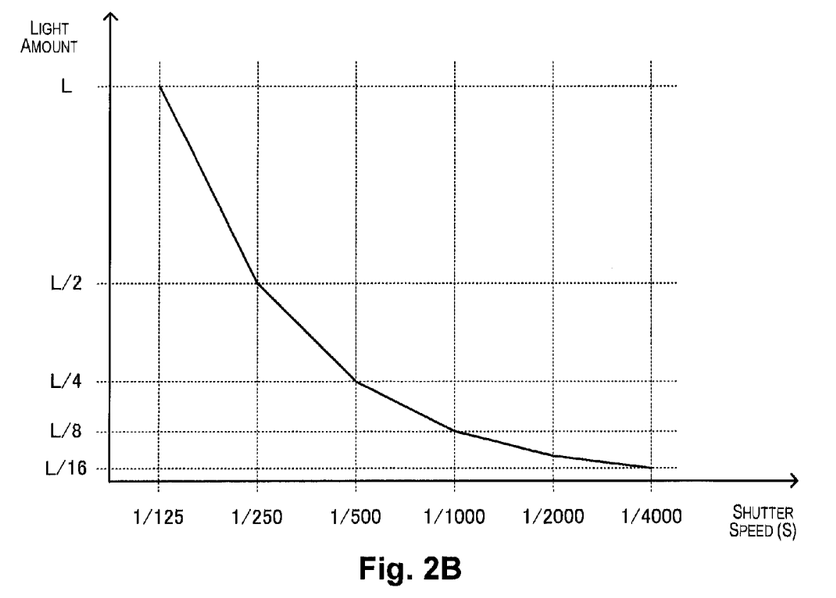
FIG. 2B shows a relationship between a shutter speed and an amount of light.

In the image capturing device 1 according to the present embodiment, the shutter speed can be changed within the same range with respect to either of the two shutter methods. In the present embodiment, the shutter speed can be selected between $1/4000$ (s) and 1 second while changing the shutter speed to be $1/2$ times or twice. However, depending on the shutter method, the possible range for changing the shutter speed can be different. For example, in the method using an electronic shutter only, it can be configured such that the speed can be increased to $1/10000$ (s). FIG. 2B is a graph showing relative change in the amount of light in a case where the shutter speed is between $1/4000$ (s) and $1/125$ (s). Specifically, in FIG. 2B, the amount of light when the shutter speed is changed with a fixed aperture of the diaphragm 12 is shown in the vertical axis, the shutter speed is shown in the horizontal axis, and the amount of light that reaches the area image sensor 14 when image capturing is conducted with the shutter speed of $1/125$ is shown as L. As shown in FIG. 2B, when the shutter speed is increased by one level, the amount of light becomes $1/2$. When the shutter speed is decreased by one level, the amount of light becomes twice.

The SOC 15 is a chip provided with a circuit that conducts various kinds of processing by a predetermined procedure. The SOC 15 controls operations of the display section 20, the recording section 30, the operating section 40, the optical system 10, and the area image sensor 14. For this control, the SOC 15 has a live view processing section 15*a*, a display controlling section 15*b*, an image capturing processing section 15*c*, and an image generating section 15*d*.

The live view processing section 15*a* has a function that specifies conditions of capturing an image for a live view display based on the instructions in the operating section 40 or default settings, and outputs a parameter to capture an image on the image capturing conditions. In the present embodiment, settings on the diaphragm, the shutter speed, and the like corresponding to the parameter are executed by the state controlling section 80. Specifically, the state controlling section 80 is a processor that adjusts the focal point, the diaphragm 12, and the shutter speed by outputting a control signal to the focal point adjusting section 50, the diaphragm adjusting section 60, and the shutter speed adjusting section 70. The shutter speed adjusted during a live view display is a shutter speed of the electronic shutter. In the present embodiment, it is configured such that a live view is executed while switching a first state before conducting focal point adjustment in which focal point adjustment is not yet conducted with an active live view, and a second state in which focal point adjustment is being conducted with an active live view. The state controlling section 80 switches each state depending on the parameter output from the live view processing section 15*a*. Details of control of the first state and the second state will be described later.

The live view processing section 15*a* also has a function that generates image data showing an image for display by conducting predetermined image processing such as γ conversion to an image captured on the image capturing conditions for a live view display. This image processing includes a process to output an evaluation value for AE (Automatic Exposure) processing and an evaluation value for AF (Automatic Focus) processing. Specifically, the live view processing section 15*a* can specify an evaluation value (such as an average value of luminance) for evaluating the brightness of an image contained in a predetermined light measurement area set within an image capturing range of the area image sensor 14, and output it as an evaluation value for AE processing. The live view processing section 15*a* can also specify an evaluation value (such as a value showing the magnitude of contrast) for evaluating the degree of focusing a target contained in a predetermined distance measurement area set within a captured image, and output it as an evaluation value for AF processing. The state controlling section 80 outputs a control signal to the diaphragm adjusting section 60 and the shutter speed adjusting section 70 based on the evaluation value for AE processing, and controls an exposure. The state controlling section 80 also outputs a control signal to the focal point adjusting section 50 based on the evaluation value for AF processing, and controls a position of the focal point. Details of AE processing and AF processing will be described later.

The display controlling section 15*b* has a function that causes the display section 20 to display image data to which image processing has been conducted by the live view processing section 15*a*. Specifically, the display controlling section 15*b* outputs the image data output from the live view processing section 15*a* to the display section 20. Also, the display controlling section 15*b* generates a vertical synchronizing signal that defines a period of time to display one frame based on a clock signal having a predetermined cycle, a horizontal synchronizing signal that defines a period of time to display one line, a data active signal that defines a period of time to take in image data in each line, and a data clock signal that defines timing and the like to take in image data of each pixel, and outputs these signals to the display section 20. As a result of this, in the display section 20, drawing per line is conducted in a cycle defined by the horizontal synchronizing signal, and frame drawing is conducted in a cycle defined by the vertical synchronizing signal. Consequently, a live view display that displays an image in a predetermined frame cycle (for example, 60 fps) can be conducted.

The image capturing processing section 15*c* has a function that outputs a parameter for capturing an image to be recorded on a recording medium in a state where the focal point has already been adjusted. In the present embodiment, a parameter showing settings of the diaphragm 12 and the shutter speed during a live view display is output as a parameter for image capturing. Specifically, in the present embodiment, an image is captured in a state where the focal point has already been adjusted by making the settings of the diaphragm 12 and the shutter speed identical to the settings of the first state, and recorded on the recording medium. More specifically, the image capturing processing section 15c outputs a parameter showing a set value of the first state to the state controlling section 80, and the state controlling section 80 outputs a control signal corresponding to this parameter to the diaphragm adjusting section 60 and the shutter speed adjusting section 70. As a result of this, image capturing is conducted by adjusting the settings of the diaphragm 12 and the shutter speed to be identical to the settings of the first state, and an image is captured in a state where AE similar to a live view display is conducted. When an image to be recorded on a recording medium is captured, image capturing is conducted by combining the shutter 13 and the electronic shutter of the area image sensor 14. Accordingly, although a parameter during a live view display is given to the shutter speed adjusting section 70, a target to be controlled is the shutter 13 and the area image sensor 14, an exposure is started in the electronic shutter, and an exposure is ended in the shutter 13.

The image generating section 15d has a function that generates image data showing an image to be recorded by conducting predetermined image processing such as γ conversion to an image captured in the settings designated by the image capturing processing section 15c, and records it on a recording medium. Specifically, image processing is conducted to an image captured by the area image sensor 14, and records image data showing an image to which image processing has been conducted on a recording medium inserted into the recording section 30.

(2) Operation in Live View Image Capturing

Next, image capturing processing will be described in detail. A live view display in the present embodiment is used for confirming an image to be captured in the process of image capturing shown in FIG. 3. In the image capturing processing, the state controlling section 80 adjusts the diaphragm 12 to have an aperture corresponding to the set value of the diaphragm 12 set by a user (step S100). Specifically, a user sets an F value of the diaphragm 12 directly or indirectly by the operating section 40 in advance. Information showing the F value of the diaphragm 12 is delivered from the live view processing section 15a to the state controlling section 80. When information showing the F value of the diaphragm 12 is delivered to the state controlling section 80, the state controlling section 80 outputs a control signal to the diaphragm adjusting section 60, and the diaphragm adjusting section 60 controls the diaphragm 12 to have an aperture corresponding to the F value of the diaphragm 12.

Figure 3:
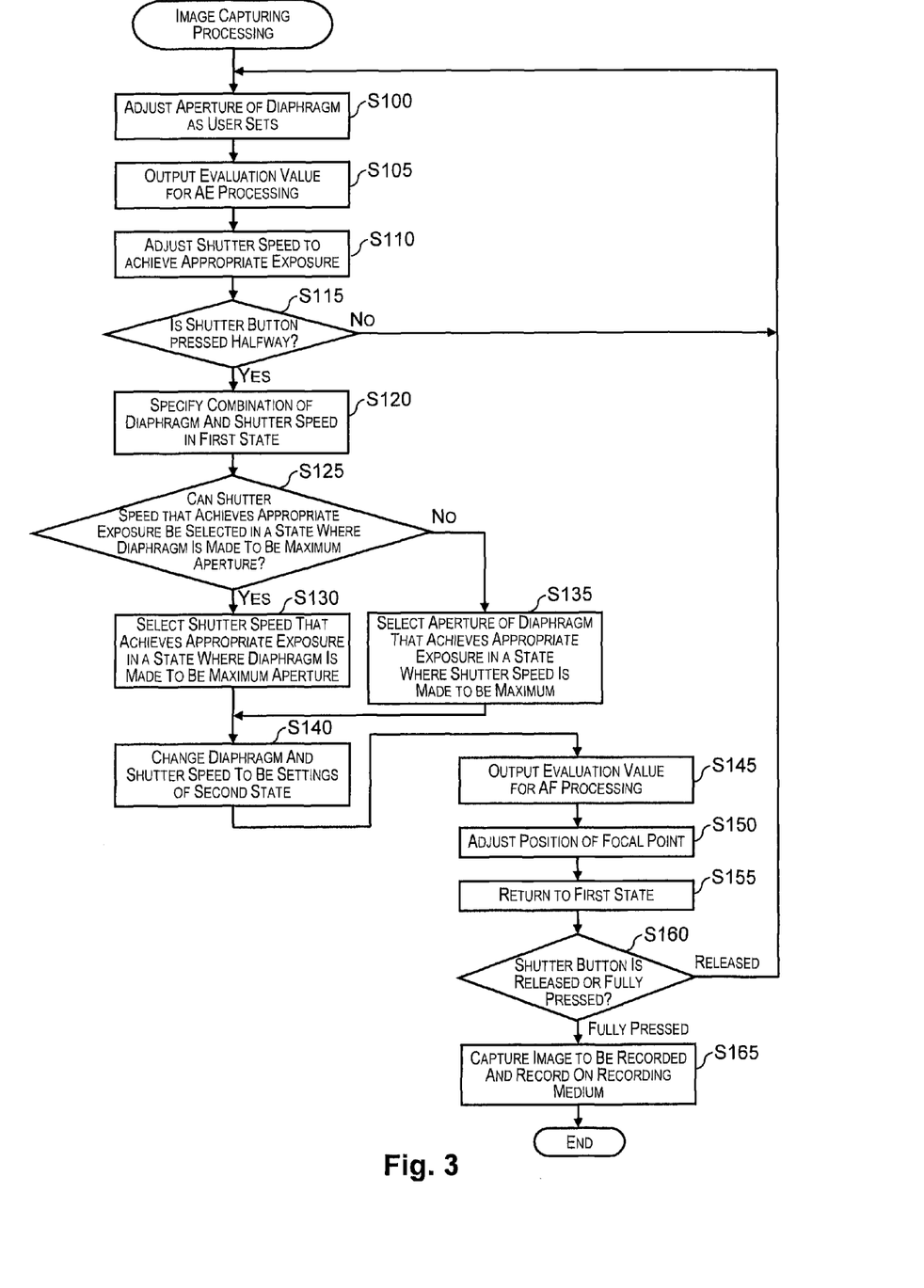
FIG. 3 is a flow chart showing image capturing processing

After the aperture of the diaphragm 12 is controlled to be the set value set by a user, the live view processing section 15a conducts AE processing. Specifically, the live view processing section 15a specifies an evaluation value for evaluating the brightness of a pixel in a light measurement area that has been set in advance within an image capturing range of the area image sensor 14, and outputs the value as an evaluation value for AE processing to the state controlling section 80 (step S105). The shutter speed in this stage is a default value (or a set value of the last image capturing).

Next, the state controlling section 80 adjusts the shutter speed to achieve an appropriate exposure by conducting feedback control based on the evaluation value for AE processing (step S110). Specifically, the state controlling section 80 determines whether the evaluation value for AE processing is within a predetermined range of an appropriate exposure, larger than the range of an appropriate exposure (the brightness of the light measurement area is bright), or smaller than the range of an appropriate exposure (the brightness of the light measurement area is dark).

When the evaluation value for AE processing is larger than the range of an appropriate exposure, the state controlling section 80 outputs a control signal for increasing the shutter speed by one level to the shutter speed adjusting section 70. As a result of this, the shutter speed adjusting section 70 makes the shutter speed of the electronic shutter in the area image sensor 14 higher than the last shutter speed by one level. In this instance, since the amount of light that reaches the area image sensor 14 becomes small compared to the last state, when the live view processing section 15a acquires the evaluation value for AE processing again in this state, the evaluation value becomes smaller than the last state. Thus, by repeating the above-described process to increase the shutter speed until the evaluation value for AE processing becomes within the range of an appropriate exposure, a state in which an image is captured with an appropriate exposure is achieved.

On the other hand, when the evaluation value for AE processing is smaller than the range of an appropriate exposure, the state controlling section 80 outputs a control signal for decreasing the shutter speed by one level to the shutter speed adjusting section 70. As a result of this, the shutter speed adjusting section 70 makes the shutter speed of the electronic shutter in the area image sensor 14 lower than the last shutter speed by one level. In this instance, since the amount of light that reaches the area image sensor 14 becomes large compared to the last state, when the live view processing section 15a acquires the evaluation value for AE processing again in this state, the evaluation value becomes larger than the last state. Thus, by repeating the above-described process to decrease the shutter speed until the evaluation value for AE processing becomes within the range of an appropriate exposure, a state in which an image is captured with an appropriate exposure is achieved.

When the aperture of the diaphragm 12 is controlled to be the set value set by a user, the evaluation value for AE processing is specified with a shutter speed of a default value (or a set value of the last image capturing). However, if the evaluation value is within the range of an appropriate exposure before adjusting the shutter speed, the shutter speed remains a default value (or a set value of the last image capturing). In the present embodiment, the first state is the above-described state in which the aperture of the diaphragm 12 is set as set by a user and the shutter speed is set to achieve an appropriate exposure.

The method for setting the shutter speed is not limited to the above-described method. A configuration can be possible in which the evaluation value for AE processing specified in step S105 and a reference brightness are compared, a shutter speed to cancel a difference between them is determined based on the ratio of the evaluation value and the reference brightness if there is a difference, and the shutter speed is set to be the determined speed. For example, when the evaluation value is 16 times brighter than the reference brightness, the shutter speed can be made 1/16 of the initial speed. Further, fine adjustment can be conducted by specifying an evaluation value for conducting AE processing again after setting the shutter speed.

When the exposure of an image to be captured becomes an appropriate exposure, the exposure of an image displayed on the display section 20 by the processing of the display controlling section 15b is appropriate, and a user can observe an image with an appropriate exposure. Also, since the aperture of the diaphragm 12 is the set value set by a user, a user can confirm if the blur of the image is as the settings of the diaphragm 12 intended by the user. Also, since an image captured by the area image sensor 14 is drawn in the display section 20 in a predetermined cycle, a user can conduct angle of view adjustment and the like while recognizing the state of an image to be captured by the image capturing section 100 in real time.

In the above-described first state, the position of the lens 11 does not change from the position of the last image capturing (or a default position), and the position of the focal point is identical to the position of the focal point of the last capturing (or a default focal point position). Accordingly, when a user changes an angle of view or a target, a state in which an area desired by a user does not come into focus might occur. In the present embodiment, therefore, a user can give instructions to start AF processing for bringing a target in the distance measurement area into focus by halfway pressing a shutter button provided in the operating section 40 during a live view display.

The live view processing section 15a then determines whether the shutter button is pressed halfway or not (step S115). When it is not determined that the shutter button is pressed halfway, the processing of step S100 and the subsequent steps is repeated. On the other hand, when it is determined that the shutter button is pressed halfway in step S115, the aperture of the diaphragm 12 is set as large as possible before the state controlling section 80 adjusts the focal point. In this instance, the state controlling section 80 also adjusts the shutter speed to maintain the exposure of an image displayed on the display section 20 corresponding to the change in the aperture of the diaphragm 12. The state achieved by the aperture of the diaphragm 12 and the shutter speed in this case is the second state for adjusting the focal point.

More specifically, in order to change from the first state to the second state, the state controlling section 80 specifies the aperture (F value) of the diaphragm 12 and the shutter speed in the first state (step S120). Since the aperture (F value) of the diaphragm 12 and the shutter speed in the first state is a combination of the aperture of the diaphragm 12 and the shutter speed that achieves an appropriate exposure, the diaphragm and the shutter speed adjusted in step S100 and step S110 are specified. The state controlling section 80 then determines whether a shutter speed that achieves an appropriate exposure can be selected in a state where the diaphragm 12 is made to be a maximum aperture (minimum F value) (step S125). Specifically, it is determined whether the exposure can be conformed to an appropriate exposure in the first state when the diaphragm 12 is made to be a maximum aperture (minimum F value) and a shutter speed is selected among a plurality of selectable settings.

When it is determined that a shutter speed that achieves an appropriate exposure can be selected in a state where the diaphragm 12 is made to be a maximum aperture (minimum F value) in step S125, the shutter speed that achieves an appropriate exposure is selected in a state where the diaphragm 12 is made to be a maximum aperture (step S130). Specifically, the state controlling section 80 adjusts the diaphragm 12 to be a maximum aperture, and adjusts the shutter speed to a shutter speed that achieves an appropriate exposure in this setting of the diaphragm 12, so that these are used as the settings of the diaphragm and the shutter speed in the second state.

Table 1 shows an example in which the first state is achieved with an F value of the diaphragm 12 of 8.0 and a shutter speed of 1/125 (s). In Table 1, the F value of the diaphragm 12 and the shutter speed in the first state are shown by a black circle.

TABLE 1

| Shutter Speed | | F Value | |
|---|---|---|---|
| 1/4000 | ↑ | 1.4 | ↑ |
| 1/2000 | | 2.0 | |
| 1/1000 | 5 Levels | 2.8 | 5 Levels |
| 1/500 | | 4.0 | |
| 1/250 | ↓ | 5.6 | ↓ |
| 1/125 | ● | 8.0 | ● |

In the example shown in Table 1, when the aperture of the diaphragm 12 is changed from the F value of the diaphragm 12 of 8.0 to the F value of 1.4 that is a maximum aperture, the F value is decreased by five levels. Accordingly, if the shutter speed can be increased by five levels, the diaphragm 12 can be changed to be a maximum aperture while maintaining an appropriate exposure. In the example shown in Table 1, when the shutter speed is increased by five levels from 1/125 (s), it becomes 1/4000 (s), which is a selectable shutter speed in the image capturing device 1. Thus, in the example shown in Table 1, the setting of the diaphragm 12 is set to be an F value of 1.4 that is a maximum aperture, the setting of the shutter speed is set to 1/4000 (s), and these are used as the settings in the second state.

On the other hand, in step S125, when it is determined that a shutter speed that achieves an appropriate exposure cannot be selected in a state where the diaphragm 12 is made to be a maximum aperture, the state controlling section 80 selects the aperture of the diaphragm 12 that achieves an appropriate exposure in a state where a shutter speed is made to be a maximum speed (step S135). Specifically, the state controlling section 80 adjusts the shutter speed to be a maximum speed, and adjusts the aperture of the diaphragm 12 to be an aperture that achieves an appropriate exposure in this setting of the shutter speed, so that these are used as the settings of the diaphragm and the shutter speed in the second state.

Table 2 shows an example in which the second state is achieved with an F value of the diaphragm 12 of 8.0 and a shutter speed of 1/500 (s). In Table 2, the F value of the diaphragm 12 and the shutter speed in the first state are shown by a black circle.

TABLE 2

| Shutter Speed | | F Value | |
|---|---|---|---|
| 1/4000 | ↑ | 1.4 | |
| 1/2000 | | 2.0 | |
| 1/1000 | 3 Levels | 2.8 | ↑ |
| 1/500 | ● | 4.0 | 3 Levels ≠ |
| 1/250 | | 5.6 | 5 Levels |
| 1/125 | | 8.0 | ● |

In the example shown in Table 2, when the aperture of the diaphragm 12 is changed from the F value of the diaphragm 12 of 8.0 to the F value of 1.4 that is a maximum aperture, the F value is decreased by five levels. However, the shutter speed cannot be increased from 1/500 (s) by five levels in the image capturing device 1. In the present example, therefore, the shutter speed of 1/4000 (s) that is a maximum speed is selected. In order to change the shutter speed of 1/500 (s) in the first state to 1/4000 (s), the shutter speed needs to be increased by three levels. Accordingly, in order to change the diaphragm 12 while maintaining the appropriate exposure, it is sufficient that the F value of the diaphragm 12 is decreased by three levels. In the example shown in Table 2, therefore, the setting of the diaphragm 12 is set to be an F value of 4.0, the setting of the shutter speed is set to 1/4000 (s), and these are used as the settings in the second state.

As described above, in the present embodiment, the second state is achieved by decreasing the F value of the diaphragm 12 by an "n" level ("n" is an integer of 0 or more), and increasing the shutter speed by the "n" level. When the settings in the second state are specified, the state controlling section 80 changes the aperture of the diaphragm 12 and the shutter speed by the "n" level to be the settings of the second state (step S140). In sum, the state controlling section 80 specifies the number "n" of levels to be changed with respect to the aperture of the diaphragm 12 and the shutter speed required for changing from the first state to the second state, and the first state is changed to the second state by changing the F value of the diaphragm 12 and the shutter speed by one level.

More specifically, when "n" is 1 or more, the state controlling section 80 outputs a control signal to the shutter speed adjusting section 70 so as to increase the shutter speed by one level, and outputs a control signal to the diaphragm adjusting section 60 so as to decrease the F value of the diaphragm 12 by one level (increase the aperture by one level). As a result of this, the shutter speed adjusting section 70 makes the shutter speed of the electronic shutter in the area image sensor 14 higher than the last shutter speed by one level. Also, the diaphragm adjusting section 60 makes the F value of the diaphragm 12 smaller than the last F value by one level. The state controlling section 80 achieves the shutter speed and the aperture of the diaphragm 12 of the second state by repeating the change in the shutter speed and the change in the aperture of the diaphragm 12 "n" times.

In the above-described processing, the state controlling section 80 changes both of the shutter speed and the aperture of the diaphragm 12 by one level. Accordingly, when the state is changed from the first state to the second state, the shutter speed and the aperture of the diaphragm 12 are changed while maintaining the appropriate exposure achieved in the first state. Thus, the first state can be changed to the second state while maintaining the exposure of an image observed by a user in the display section 20 to be in an appropriate state.

When the second state is achieved as described above, AF processing is started. Specifically, the live view processing section 15a outputs an evaluation value for evaluating the degree of focusing a target contained in a predetermined distance measurement area set within a captured image to the state controlling section 80 as an evaluation value for AF processing (step S145). The state controlling section 80 then adjusts the position of the focal point while conducting feedback control based on the evaluation value for AF processing (step S150). Specifically, the state controlling section 80 drives the lens 11 until the evaluation value for AF processing is placed in a state of showing a maximum degree of focusing.

For example, in a case where the evaluation value for AF processing is a value showing the magnitude of contrast, the state controlling section 80 relates the value showing the magnitude of contrast output by the live view processing section 15a and the position of the lens 11 when the operating section 40 gives instructions to start the AF processing, and stores in a predetermined recording medium. Next, the state controlling section 80 outputs a control signal for moving the focal point by a predetermined distance to the focal point adjusting section 50. As a result of this, the focal point adjusting section 50 drives the lens 11, and moves the focal point by a predetermined distance. The live view processing section 15a then outputs a value showing the magnitude of contrast again after the focal point is moved by a predetermined distance. This value showing the magnitude of contrast and the position of the lens 11 after movement are related, and stored in the predetermined recording medium.

The state controlling section 80 repeats driving the lens 11 as described above such that the movement direction of the focal point becomes a single direction, and specifies the position of the lens 11 that makes the magnitude of contrast a maximum value. When the position of the lens 11 that makes the magnitude of contrast a maximum value is specified, the state controlling section 80 outputs a control signal to the focal point adjusting section 50, and adjusts the position of the lens 11 so as to make the magnitude of contrast a maximum value. As a result of this, a state where an image can be captured is created with a target in the distance measurement area coming into a focus. Incidentally, the AF processing can be conducted by another method.

The above-described adjustment of the focal point is conducted in the second state. Accordingly, the adjustment of the focal point is conducted after the state is changed such that the aperture of the diaphragm 12 is as large as possible within a range of maintaining the appropriate exposure achieved by the first state. When the aperture of the diaphragm 12 becomes large, the depth of field becomes small. Since a depth of field is a range in which it can be considered that a target comes into focus, when the depth of field becomes small, the range in which it can be considered that a target comes into focus becomes small. This means that the focal point is adjusted after the range in which it can be considered that a target comes into focus is made as small as possible in the present embodiment.

When the range in which it can be considered that a target comes into focus is small, change in the magnitude of contrast in a case of changing the position of the focal point by a unit distance becomes large, which makes it easy to bring a target into focus. Also, when the range in which it can be considered that a target comes into focus is small, change in the magnitude of contrast becomes drastic corresponding to movement of the position of the lens 11, which makes it possible to quickly bring a target into focus. In the present embodiment, therefore, it is possible to bring a target into focus as accurately and quickly as possible within a range that maintains the appropriate exposure by changing the first state to the second state before adjusting the focal point.

When the above-described adjustment of the focal point is ended, the state controlling section 80 outputs a control signal to the diaphragm adjusting section 60 and the shutter speed adjusting section 70 respectively so as to return the settings of the aperture of the diaphragm 12 and the shutter speed to the first state again (step S155). Next, the image capturing processing section 15c determines whether the halfway pressing of the shutter button is released or the shutter button is fully pressed in the operating section 40 (step S160). When it is determined that the halfway pressing of the shutter button is released in step S160, the processing of step S100 and the subsequent steps is repeated. Specifically, the live view display on the display section 20 is continued in the first state.

On the other hand, when it is determined that the shutter button is fully pressed in step S160, an image to be recorded is captured and recorded on a recording medium by the image capturing processing section 15c and the image generating section 15d (step S165). Specifically, an image is captured and recorded by the setting of an exposure in the first state. With the above-described configuration, the position of the focal point can be adjusted accurately and quickly by halfway pressing of the shutter button while conducting a live view with a state of the diaphragm 12 desired by a user, and a state of conducting a live view with a state of the diaphragm 12 desired by a user can be achieved by releasing the halfway pressing of the shutter button. Also, with the above-described configuration, the position of the focal point can be adjusted accurately and quickly by halfway pressing of the shutter button while conducting a live view with a state of the diaphragm 12 desired by a user, and an image can be captured with a state of the diaphragm 12 desired by a user by fully pressing the shutter button. When image capturing is ended, it goes back to step S100 for next image capturing.

(3) Other Embodiments

The above-described embodiment is one example of implementing the invention, and other various embodiments are possible as long as the focal point is adjusted in a state in which the aperture of the diaphragm is made as large as possible within a combination of a possible aperture of the diaphragm and a possible shutter speed.

For example, the display section 20 is an EVF that uses a liquid crystal panel in the above-described embodiment. However, the display section 20 can be a display section other than an EVF including a display section that uses a liquid crystal panel attached to a rear surface of the image capturing device 1, and a display section that uses a method other than a liquid crystal panel. The image capturing device 1 can be a single-lens reflex camera provided with a mirror, a movie camera, or a device such as a cell phone provided with an image capturing function. Further, although the color filter has a Bayer array in the above-described image area sensor 14, the invention can be applied to an image capturing device that uses a sensor constructed of an array other than a Bayer array. For example, the invention can be applied to an image capturing device that uses a 3CCD or a three-layer sensor. Further, in the above-described embodiment, a live view is conducted in a diaphragm priority mode that adjusts the shutter speed by conducting AE in a state where the aperture of the diaphragm 12 has been adjusted based on the setting by a user. However, a live view can be conducted in another image capturing mode such as a shutter speed priority mode. Further, the F value of the diaphragm can be changed by a smaller adjustment width than one level, and the shutter speed can be changed by an adjustment width in accordance with the adjustment width of the diaphragm.

Further, in the above-described embodiment, in order to achieve the second state, the state controlling section 80 outputs a control signal to both of the shutter speed adjusting section 70 and the diaphragm adjusting section 60, so that change in the shutter speed and change in the diaphragm 12 can be synchronized. However, if change in the shutter speed and change in the diaphragm 12 cannot be synchronized completely, either one of change in the shutter speed and change in the diaphragm 12 can precede the other. Specifically, if change in the shutter speed and change in the diaphragm 12 do not synchronize completely, a very short period of time in which the exposure is different from an appropriate exposure can occur from the beginning of both changes to the end thereof.

Thus, in a case where an influence on a user is smaller when an image is bright than when an image is dark, change in the aperture of the diaphragm 12 can precede change in the shutter speed. In a case where an influence on a user is smaller when an image is dark than when an image is bright, change in the shutter speed can precede change in the diaphragm 12.

Also, a user who is conducting angle of view adjustment and the like by looking at the display section carefully might turn the eyes when an image displayed on the display section 20 becomes bright. It is considered that a user will look at the display section 20 more carefully when an image displayed on the display section 20 becomes dark. Therefore, it can be considered that the former brings more discomfort to a user than the latter. In such a case, change in the shutter speed should precede change in the diaphragm 12.

For example, in the configuration shown in FIG. 1, after the changing level "n" of the diaphragm 12 and the shutter speed required to change the first state to the second state is specified, the state controlling section 80 can output a control signal to the shutter speed adjusting section 70 so as to increase the shutter speed by one level, and after a predetermined period of time passes, the state controlling section 80 can output a control signal to the diaphragm adjusting section 60 so as to decrease the F value of the diaphragm 12 by one level. With this configuration, after the shutter speed adjusting section 70 makes the shutter speed of the electronic shutter in the area image sensor 14 higher than the last shutter speed by one level, the diaphragm adjusting section 60 makes the F value of the diaphragm 12 smaller than the last F value by one level.

The control signal can be output simultaneously to the shutter speed adjusting section 70 and the diaphragm adjusting section 60, or can be output to the diaphragm adjusting section 60 first before being output to the shutter speed adjusting section 70. It is sufficient that change in the shutter speed in response to the control signal precedes change in the diaphragm in the end. If change in the shutter speed and change in the diaphragm 12 do not synchronize completely, when the shutter speed and the diaphragm 12 are changed by a plurality of levels, a change width in each level can be reduced. For example, the F value of the diaphragm 12 can be changed by a smaller adjustment width than one level, and the shutter speed can be changed by an adjustment width in accordance with the adjustment width of the diaphragm. With this configuration, the brightness of an image can be prevented from changing. Further, the gain of the image capturing element can be adjusted so as to cancel change in the brightness caused by a situation in which change in the shutter speed and change in the diaphragm 12 do not synchronize completely.

As described above, the state controlling section 80 is configured such that change in the shutter speed and change in the aperture of the diaphragm 12 are repeated "n" times, and thus the shutter speed and the diaphragm 12 of the second state can be achieved while causing change in the shutter speed to precede change in the diaphragm 12. Here, a predetermined period of time that is a period from outputting a control signal by the state controlling section 80 to the shutter speed adjusting section 70 until outputting a control signal by the state controlling section 80 to the diaphragm adjusting section 60 can be set to a minimum value that does not allow change in the diaphragm 12 to exceed change in the shutter speed. With this configuration, it is possible to control discomfort brought to a user in the process of changing the first state to the second state.

Further, the change rate of the aperture might be different between a case where the aperture of the diaphragm 12 is large and a case where the aperture of the diaphragm 12 is small in the process of changing the diaphragm 12. Thus, when the change rate of the aperture is different depending on the size of the aperture of the diaphragm 12, a configuration in which the shutter speed is changed at the change rate corresponding to the first aperture at the time of changing the first state to the second state can be employed. For example, when the first state is changed to the second state by changing the shutter speed and the diaphragm 12 by an "n" level, it is configured such that the state controlling section 80 outputs a control signal to the diaphragm adjusting section 60 so as to change the diaphragm 12 by the "n" level. It is also configured such that the shutter speed is changed by "n" level by causing the state controlling section 80 to repeat processing that outputs a control signal to the shutter speed adjusting section 70 so as to change the shutter speed by one level and change the shutter speed by one level again after the state controlling section 80 waits for a predetermined period of time to pass. In this configuration, the change rate at the time of changing the shutter speed is specified in advance with respect to the F value of the diaphragm 12 before changing such that change in the shutter speed follows change in the diaphragm 12. The above-described predetermined period of time is specified so as to change the shutter speed at the specified change rate, and the state controlling section 80 repeats processing that changes the shutter speed after the state controlling section 80 waits for the specified predetermined period of time to pass. Specifically, the change rate at the time of changing the shutter speed is changed by changing the time required for the shutter speed to change by one level depending on the shutter speed, and change in the shutter speed is caused to follow the change in the diaphragm 12 by adjusting the change rate (time required for change by one level). With this configuration, change in the shutter speed can be caused to follow change in the aperture of the diaphragm 12.

Further, in the above-described embodiment, the AF operation is conducted by setting the aperture of the diaphragm to be as large as possible in the second state. However, when the aperture of the diaphragm becomes large, the depth of field becomes excessively narrow, which can cause a situation in which whether the position of the focal point should be controlled to be farther or to a near view cannot be determined. In such a situation, it can be configured such that the contrast of an image captured by reducing the aperture of the diaphragm set as the second state once is increased somewhat, the AF operation is conducted so as to specify a rough position of the focal point, and thereafter the AF operation is conducted by increasing the aperture of the diaphragm again. With this configuration, the focal point can be adjusted at high speed with high accuracy even in a case of an image in which the focal point is difficult to specify. Obviously, in this case, a live view display can be continued without changing the exposure by changing the shutter speed to follow change in the aperture of the diaphragm.

Further, in the first state, when the aperture of the diaphragm 12 is already a maximum aperture, the second aperture that is larger than the maximum aperture cannot be achieved. In such a case, therefore, the focal point can be adjusted by giving instructions to the focal point adjusting section in the first state. Also, there might be a case where the shutter speed that achieves a predetermined exposure cannot be selected with an aperture of the diaphragm 12 larger than the first aperture. In such a case, the focal point can also be adjusted by giving instructions to the focal point adjusting section in the first state.

The AF control is not limited to one that is conducted only in the second state, and it can be conducted in the first state. In such a case, AF is conducted with relatively low accuracy in the first state, and AF is conducted with higher accuracy in the second state than in the first state. Specifically, the first state is a state in which AF is conducted although AF with high accuracy is not yet conducted.

Further, in the above-described embodiment, the explanation after pressing the shutter button halfway is made without considering change in the brightness of a target for simplicity of the explanation. However, when the brightness of a target changes, it is preferable to adjust at least one of the aperture of the diaphragm 12 and the shutter speed corresponding to the change in the brightness. For example, in a case where a predetermined exposure occurs with an aperture of the diaphragm and a shutter speed different from those of the first state after the focal point is adjusted, it can be possible to make it a third state where an image is captured with a predetermined exposure in which an aperture of the diaphragm 12 is smaller than the second aperture and a shutter speed is lower than the second shutter speed after the focal point is adjusted. If an image is captured with a predetermined exposure in the first state after the focal point is adjusted, the state is placed in the first state after the focal point is adjusted.

It is preferable to synchronize change in the shutter speed and change in the diaphragm 12 when the settings of the aperture of the diaphragm 12 and the shutter speed are returned to the first state in step S155. However, if change in the shutter speed and change in the diaphragm 12 cannot be synchronized completely, preferably change in the diaphragm 12 precedes change in the shutter speed.

What is claimed is:

1. An image capturing device comprising:
    an image capturing section that captures an image by light passing through a lens;
    a diaphragm adjusting section that adjusts an aperture of a diaphragm at the time of image capturing in the image capturing section;
    a shutter speed adjusting section that adjusts a shutter speed at the time of image capturing in the image capturing section;
    a display section that displays an image captured by the image capturing section; and
    a state controlling section that changes a first state to a second state by giving instructions to the diaphragm adjusting section and the shutter speed adjusting section while the image captured by the image capturing section is displayed on the display section, and adjusts a focal point of the lens in the second state, wherein
    the first state is a state where the image is captured with a predetermined exposure in which the aperture of the diaphragm is a first aperture and the shutter speed is a first shutter speed,
    the second state is a state where the image is captured with the predetermined exposure in which the aperture of the diaphragm is a second aperture larger than the first aperture and the shutter speed is a second shutter speed higher than the first shutter speed, and
    the state controlling section changes the shutter speed before changing the diaphragm when the first state is changed to the second state.

2. The image capturing device according to claim 1, wherein
    the state controlling section gives instructions to the diaphragm adjusting section and the shutter speed adjusting section after the focal point is adjusted, and
    the second state is changed to a third state in which an image is captured with the predetermined exposure in which the aperture of the diaphragm is smaller than the second aperture and the shutter speed is lower than the second shutter speed.

3. The image capturing device according to claim 2, wherein the state controlling section causes a change in the diaphragm to precede a change in the shutter speed after the focal point is adjusted.

4. The image capturing device according to claim 2, wherein
the third state is the first state.

5. The image capturing device according to claim 1, wherein
the state controlling section changes the shutter speed at a change rate corresponding to a change rate of the diaphragm when the first state is changed to the second state.

6. The image capturing device according to claim 1, wherein
the state controlling section repeats the change in the shutter speed and the change in the diaphragm a plurality of times.

7. An image capturing device comprising:
an image capturing section that captures an image by light passing through a lens;
a diaphragm adjusting section that adjusts an aperture of a diaphragm at the time of image capturing in the image capturing section;
a shutter speed adjusting section that adjusts a shutter speed at the time of image capturing in the image capturing section;
a display section that displays an image captured by the image capturing section; and
a state controlling section that changes a first state to a second state by giving instructions to the diaphragm adjusting section and the shutter speed adjusting section while the image captured by the image capturing section is displayed on the display section, and adjusts a focal point of the lens in the second state, wherein
the first state is a state where the image is captured with a predetermined exposure in which the aperture of the diaphragm is a first aperture and the shutter speed is a first shutter speed,
the second state is a state where the image is captured with the predetermined exposure in which the aperture of the diaphragm is a second aperture larger than the first aperture and the shutter speed is a second shutter speed higher than the first shutter speed, and
the state controlling section changes the shutter speed at a change rate corresponding to a change rate of the diaphragm when the first state is changed to the second state.

8. The image capturing device according to claim 7, wherein
the state controlling section repeats a change in the shutter speed and a change in the diaphragm a plurality of times.

9. An image capturing device comprising:
an image capturing section that captures an image by light passing through a lens;
a diaphragm adjusting section that adjusts an aperture of a diaphragm at the time of image capturing in the image capturing section;
a shutter speed adjusting section that adjusts a shutter speed at the time of image capturing in the image capturing section;
a display section that displays an image captured by the image capturing section; and
a state controlling section that changes a first state to a second state by giving instructions to the diaphragm adjusting section and the shutter speed adjusting section while the image captured by the image capturing section is displayed on the display section, and adjusts a focal point of the lens in the second state, wherein
the first state is a state where the image is captured with a predetermined exposure in which the aperture of the diaphragm is a first aperture and the shutter speed is a first shutter speed,
the second state is a state where the image is captured with the predetermined exposure in which the aperture of the diaphragm is a second aperture larger than the first aperture and the shutter speed is a second shutter speed higher than the first shutter speed,
when the shutter speed to achieve the predetermined exposure in a state where the aperture of the diaphragm is the maximum aperture can be selected, the state controlling section achieves the second state by the shutter speed to achieve the predetermined exposure in a state where the aperture of the diaphragm is the maximum aperture, and the maximum aperture, and
when the shutter speed to achieve the predetermined exposure in a state where the aperture of the diaphragm is the maximum aperture cannot be selected, the state controlling section achieves the second state by an aperture of the diaphragm that is larger than the first aperture to achieve the predetermined exposure in a state where the shutter speed is a shutter speed higher than the first shutter speed and smaller than the maximum aperture, and the shutter speed higher than the first shutter speed.

10. The image capturing device according to claim 9, wherein the state controlling section causes the focal point to be adjusted in the first state without changing to the second state when the first aperture is a maximum aperture or the first shutter speed is a maximum shutter speed.

11. The image capturing device according to claim 9, further comprising:
a focal point adjusting section that adjusts the focal point of the lens based on an output of the image capturing section, wherein
the state controlling section causes the focal point adjusting section to adjust the focal point of the lens in the second state.

12. The image capturing device according to claim 9, wherein
the state controlling section changes the shutter speed before changing the diaphragm when the first state is changed to the second state.

13. The image capturing device according to claim 9, wherein
the state controlling section changes the shutter speed at a change rate corresponding to a change rate of the diaphragm when the first state is changed to the second state.

* * * * *